US011057634B2

(12) United States Patent
Schroers et al.

(10) Patent No.: US 11,057,634 B2
(45) Date of Patent: Jul. 6, 2021

(54) CONTENT ADAPTIVE OPTIMIZATION FOR NEURAL DATA COMPRESSION

(71) Applicant: Disney Enterprises, Inc., Burbank, CA (US)

(72) Inventors: Christopher Schroers, Zürich (CH); Simon Meierhans, Zürich (CH); Joaquim Campos, St. Sulpice (CH); Jared McPhillen, Glendale, CA (US); Abdelaziz Djelouah, Zürich (CH); Erika Varis Doggett, Los Angeles, CA (US); Scott Labrozzi, Cary, NC (US); Yuanyi Xue, Kensington, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/413,414

(22) Filed: May 15, 2019

(65) Prior Publication Data

US 2020/0366914 A1    Nov. 19, 2020

(51) Int. Cl.
*H04N 19/42* (2014.01)
*G06N 3/02* (2006.01)
(Continued)

(52) U.S. Cl.
CPC .............. *H04N 19/42* (2014.11); *G06N 3/02* (2013.01); *G06N 7/005* (2013.01); *H04N 19/186* (2014.11); *H04N 19/513* (2014.11)

(58) Field of Classification Search
CPC .................................................. G06T 9/002
See application file for complete search history.

(56) References Cited

U.S. PATENT DOCUMENTS 10,158,859 B2    12/2018  Nowozin
10,192,327 B1 *   1/2019  Toderici ............... G06K 9/6256
(Continued)

FOREIGN PATENT DOCUMENTS

CN          109242788       1/2019
KR     10-2018-0100976 A    9/2018
(Continued)

OTHER PUBLICATIONS

Ballé, Johannes, Valero Laparra, and Eero P. Simoncelli. "End-to-end optimized image compression." arXiv preprint arXiv: 1611. 01704 (2016). (Year: 2016).*
(Continued)

*Primary Examiner* — Clifford Hilaire
(74) *Attorney, Agent, or Firm* — Farjami & Farjami LLP

(57) ABSTRACT

A data processing system includes a computing platform having a hardware processor and a memory storing a data compression software code. The hardware processor executes the data compression software code to receive a series of compression input data and encode a first compression input data of the series to a latent space representation of the first compression input data. The data compression software code further decodes the latent space representation to produce an input space representation of the first compression input data corresponding to the latent space representation, and generates f refined latent values for re-encoding the first compression input data based on a comparison of the first compression input data with its input space representation. The data compression software code then re-encodes the first compression input data using the refined latent values to produce a first compressed data corresponding to the first compression input data.

20 Claims, 4 Drawing Sheets

(51) Int. Cl.
*H04N 19/186* (2014.01)
*H04N 19/513* (2014.01)
*G06N 7/00* (2006.01)

(56) References Cited

U.S. PATENT DOCUMENTS

| | | | |
|---|---|---|---|
| 2016/0379352 | A1 | 12/2016 | Zhang et al. |
| 2017/0230675 | A1* | 8/2017 | Wierstra .................. G06N 3/08 |
| 2019/0026631 | A1 | 1/2019 | Carr |
| 2019/0035113 | A1* | 1/2019 | Salvi .................... G06N 3/0445 |

FOREIGN PATENT DOCUMENTS

| | | |
|---|---|---|
| KR | 10-1957812 B1 | 3/2019 |
| KR | 10-2019-0040586 A | 4/2019 |
| WO | 2017-144881 A1 | 8/2017 |
| WO | WO2018224690 | 12/2018 |

OTHER PUBLICATIONS

Minnen, et al. "Image-Dependent Local Entropy Models for Learned Image Compression." arxiv:1805.12295v1 [cs.CV] May 31, 2018. pp. 1-5.

Minnen, et al. "Joint Autoregressive and Hierarchical Priors for Learned Image Compression." arXiv:1809.02736v1 [cs.CV] Sep. 8, 2018. pp. 1-22.

Mentzer, et al. "Conditional Probability Models for Deep Image Compression." https://arxiv.org/pdf/1801.04260.pdf. CVPR 2018. pp. 1-9.

Balle, et al. "Variational Image Compression With a Scale Hyperprior." arXiv:1802.01436v2 [eess.IV] May 1, 2018. pp. 1-23.

Balle, et al. "End-To-End Optimized Image Compression." arXiv:1611.01704v3 [cs.CV] Mar. 3, 2017. pp. 1-27.

Balle, et al. "Density Modeling of Images Using a Generalized Normalization Transformation." arXiv:1511.06281v4 [cs.LG] Feb. 29, 2016. pp. 1-14.

Balle, Johannes. "Efficient Nonlinear Transforms for Lossy Image Compression." arXiv:1802.00847v2 [eess.IV] Jul. 31, 2018. pp. 1-6.

Pessoa, et al. "End-To-End Learning of Video Compression Using Spatio-Temporal Autoencoders." ICLR 2019 Conference, Sep. 2018. pp. 1-13.

Santurkar, et al. "Generative Compression." arXiv:1703.01467v2 [cs.CV] Jun. 4, 2017. pp. 1-10.

Torfason, et al. "Towards Image Understanding From Deep Compression Without Decoding." arXiv:1803.06131v1 [cs.CV] Mar. 16, 2018. pp. 1-17.

Tschannen, et al. "Deep Generative Models for Distribution-Preserving Lossy Compression." 32nd Conference on Neural Information Processing Systems, 2018. pp. 1-12.

International Search Report and Written Opinion in PCT Application Serial No. PCT/US2020/31594 dated Aug. 26, 2020.

\* cited by examiner

Data Compression with Content Adaptive Optimization

1: procedure REFINELATENTS($y, x$)
2:   loop until converged:
3:     $\tilde{y} := y + \mathcal{U}(-\frac{1}{2}, \frac{1}{2})$
4:     $\tilde{x} := \phi(\tilde{y})$
5:     $L(\tilde{y}) := \sum_i -\log_2 p_{\tilde{Y}_i}(\tilde{y}_i) + \lambda d(x, \tilde{x})$
6:     $y := y + \text{step}(L(\psi, \phi, p_{\tilde{y}}, x))$
7:   return :
8:     $y$
9: procedure ENCODE($x$)
10:     $y := \psi(x)$
11:     $y := \text{RefineLatents}(y, x)$
12:     $\hat{y} := \text{quantize}(y)$
13:     $b := AE(\hat{y})$
14:   return :
15:     $b$
16: procedure DECODE($b$)
17:     $\hat{y} = AD(b)$
18:     $\hat{x} = \phi(\hat{y})$

Fig. 3

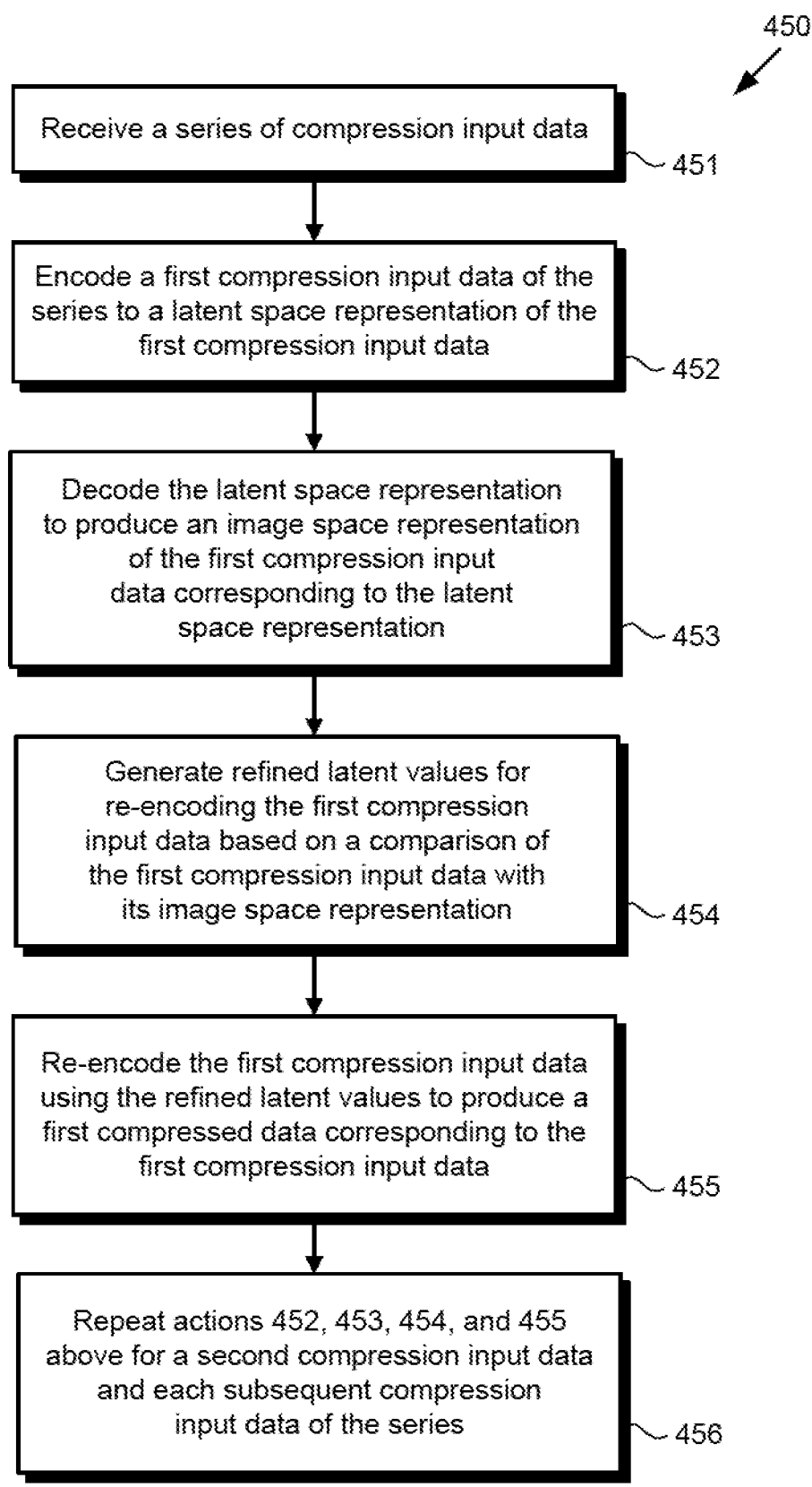

CONTENT ADAPTIVE OPTIMIZATION FOR NEURAL DATA COMPRESSION

BACKGROUND

A significant fraction of Internet traffic involves the transmission of video content, and that fraction will likely continue to increase into the foreseeable future. Because image compression is at the core of substantially all video coding approaches, improvements in the compression of image data are expected to have a significant and beneficial impact on the transmission of video as well. Traditional approaches to performing image compression have utilized compression codecs that rely on hand-crafting of individual components. More recently, several neural network based approaches for image compression have been developed.

In conventional neural network based approaches to image compression, a rate-distortion objective function is typically optimized over a corpus of images in order to find functions for encoding and decoding that are parameterized by a neural network. Once this optimization is complete, the training phase for the neural network is concluded and the encoder function is stored at a sender, while the decoder function is stored at a receiver.

SUMMARY

There are provided systems and methods for performing content adaptive optimization for neural data compression, substantially as shown in and/or described in connection with at least one of the figures, and as set forth more completely in the claims.

BRIEF DESCRIPTION OF THE DRAWINGS

FIG. 3 shows an exemplary algorithm for use in performing content adaptive optimization for neural data compression, according to one implementation; and FIG. 4 shows a flowchart presenting an exemplary method for performing to content adaptive optimization for neural data compression, according to one implementation.

DETAILED DESCRIPTION

Figure 1:
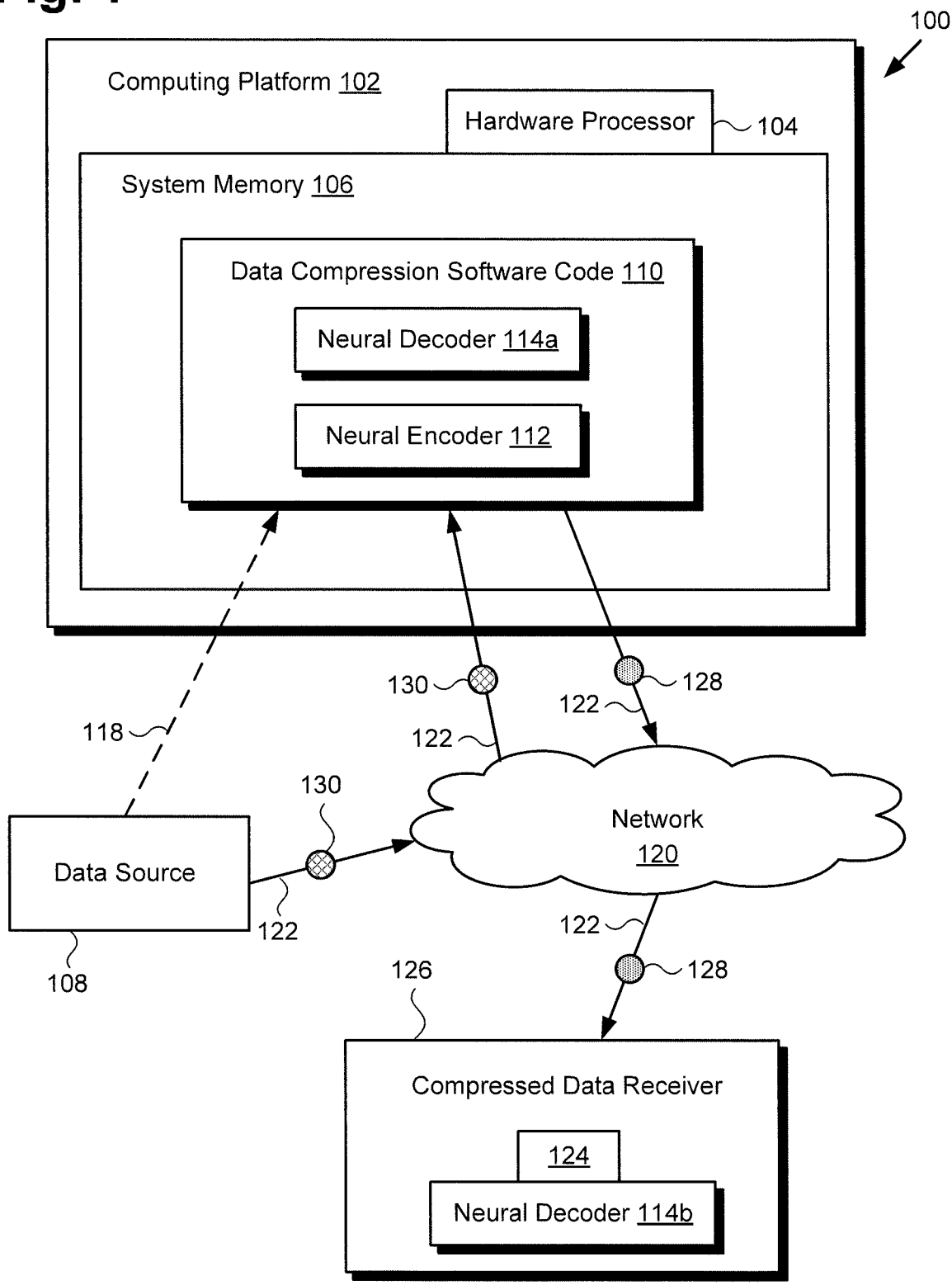
FIG. 1 shows a diagram of an exemplary data processing system for performing content adaptive optimization for neural data compression, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a neural data compression solution that overcomes the drawbacks and deficiencies in the conventional art. By contrast, the present application introduces an iterative procedure which adapts the latent representation encoded by a neural encoder to the specific content being compressed while keeping the parameters of the neural network and the predictive model fixed. The present solution delivers an overall increase in rate-distortion performance, independently of the specific architecture used to implement the neural network.

Thus, while conventional approaches to improving neural data compression have focused on more efficient architectures and predictive models, the content adaptive optimization approach disclosed in the present application refines, i.e., improves, the latent representations individually, on a per-image basis, during the encoding process. Due to this per-image adaptation, the refined latent image representation encoded using the present solution is more efficient in terms of rate-distortion performance compared to a latent representation obtained with a simple forward pass through the neural encoder.

The solution disclosed in the present application is general and, as such, can be applied to improve a number of different architectures for learned data compression. A significant advantage of the present neural data compression solution lies in its enablement of an improved compression performance while the neural compression network and the predictive model are kept fixed, and the computing time on the decoder side remains unchanged.

It is noted that, as defined in the present application, an artificial neural network (ANN), or simply neural network (NN) is a type of machine learning framework in which patterns or learned representations of observed data are processed using highly connected computational layers that map the relationship between inputs and outputs. A "deep neural network", in the context of deep learning, may refer to a neural network that utilizes multiple hidden layers between input and output layers, which may allow for learning based on features not explicitly defined in raw data. "Online deep learning" may refer to a type of deep learning in which machine learning models are updated using incoming data streams, and are designed to progressively improve their performance of a specific task as new data is received and/or adapt to new patterns of a dynamic system. As such, various forms of ANNs may be used to make predictions about new data based on past examples or "training data". In various implementations, ANNs may be utilized to perform image processing or natural-language processing.

FIG. 1 shows a diagram of an exemplary data processing system for performing content adaptive optimization for neural data compression, according to one implementation. As shown in FIG. 1, data processing system 100 includes computing platform 102 having hardware processor 104, and system memory 106 implemented as a non-transitory storage device. According to the present exemplary implementation, system memory 106 stores data compression software code 110 including neural encoder 112 and neural decoder 114a parameterized by an ANN.

As further shown in FIG. 1, data processing system 100 is implemented within a use environment including communication network 120, data source 108, and compressed data receiver 126 including neural decoder 114b and display 124. Also shown in FIG. 1 are network communication links 122, series of compression input data 130 received by data processing system 100 from data source 108 via communication network 120, and compressed data bitstream 128 transmitted by data processing system 100 to compressed data receiver 126.

It is noted that, in some implementations, data processing system 100 may include compressed data receiver 126, as well as computing platform 102. It is further noted that neural decoder 114b of compressed data receiver 126 is substantially identical to neural decoder 114a of data compression software code 110. That is to say, neural decoder 114b is parameterized by the same ANN having the same architecture used to parametrize neural decoder 114a. It is also noted that although data processing system 100 may receive series of compression input data 130 from data source 108 via communication network 120 and network communication links 122, in some implementations, data source 108 may be integrated with computing platform 102, or may be in direct communication with data processing system 100 as shown by dashed communication link 118.

Series of compression input data 130 may include compressible data in a variety of forms, including images, audio data, two-dimensional (2D) motion fields, and color residuals, to name a few examples. In implementations in which the compression input data corresponds to images, for example series of compression input data 130 may correspond to a video stream, for example, where each compression input data is an individual frame of video. However, in other implementations, each of compression input data 130 may be an individual color value or data describing a 2D motion.

Although the present application refers to data compression software code 110 as being stored in system memory 106 for conceptual clarity, more generally, data compression software code 110 may be stored on any computer-readable non-transitory storage medium. The expression "computer-readable non-transitory storage medium," as used in the present application, refers to any medium, excluding a carrier wave or other transitory signal, capable of providing instructions to a hardware processor, such as hardware processor 104 of computing platform 102, for example. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts data compression software code 110 as being stored in its entirety in system memory 106, that representation is also provided merely as an aid to conceptual clarity. More generally, data processing system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within data processing system 100.

According to the implementation shown by FIG. 1, data processing system 100 receives series of compression input data 130 from data source 108 via communication network 120 and network communication links 122. In one such implementation, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of private or limited distribution network.

Figure 2:
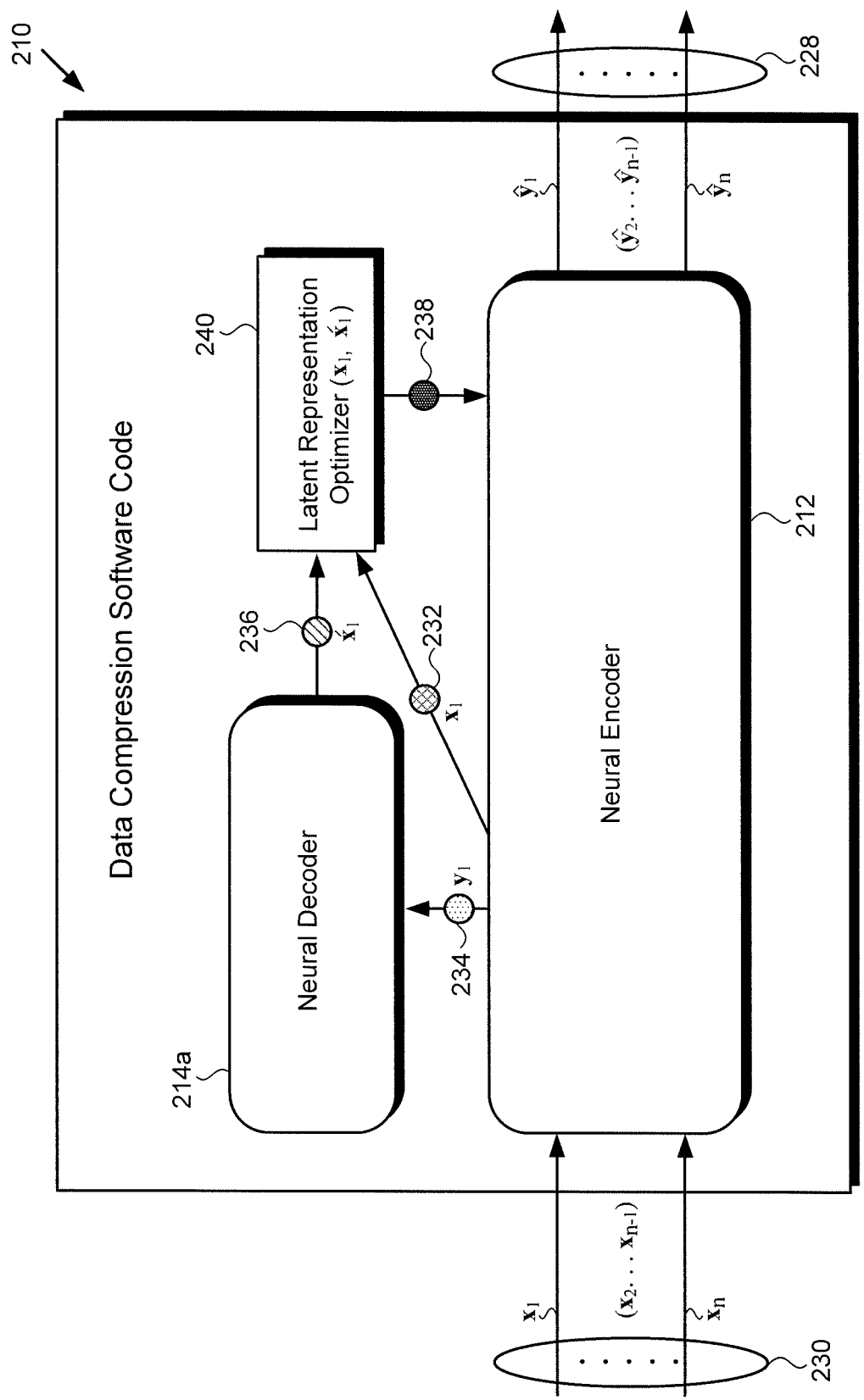
FIG. 2 shows an exemplary data compression software code suitable for use by the data processing system shown in FIG. 1, according to one implementation.

FIG. 2 shows exemplary data compression software code 210 suitable for use by data processing system 100 in FIG. 1, according to one implementation. In addition, FIG. 2 shows series of compression input data $x_1, \ldots, x_n$ 230 received as an input to neural encoder 212, and compressed data bitstream $\hat{y}_1, \ldots, \hat{y}_n$ 228 provided as an output by neural encoder 212. As shown in FIG. 2, in addition to neural encoder 212 including, data compression software code 210 also includes neural decoder 214a, and latent representation optimizer 240. Also shown in FIG. 2 are exemplary first compression input data 232 ($x_1$) of series of compression input data 230, encoded latent representation 234 ($y_1$) of first compression input data 232, decoded input space representation 236 ($\hat{x}_1$) corresponding to encoded latent representation 234, and first compression input data refined latent values 238 for re-encoding first compression input data 232.

Series of compression input data 230, data compression software code 210 including neural encoder 212 and neural decoder 214a, and compressed data bitstream 228 correspond respectively in general to series of compression input data 130, data compression software code 110 including neural encoder 112 and neural decoder 114a, and compressed data bitstream 128, in FIG. 1. That is to say, series of compression input data 130, data compression software code 110, and compressed data bitstream 128 may share any of the characteristics attributed to respective series of compression input data 230, data compression software code 210, and compressed data bitstream 228 by the present disclosure, and vice versa. Thus, although not shown in FIG. 1, data compression software code 110 may include latent representation optimizer 240.

It is noted that the goal of lossy data compression is to find a mapping or encoding function $\psi: X \to \mathcal{Y}$ from the input space X to a latent space representation $\mathcal{Y}$ using neural encoder 112/212 and its reverse mapping or decoding function $\phi: \mathcal{Y} \to X$ back to the original input space using neural decoder 114a/214a/114b. That mapping and reverse mapping are subject to the following competing constraints: (1) the latent representation should occupy as little storage as possible while, (2) the reconstructed image should closely resemble the original image.

In neural data compression, this mapping is realized with a neural encoder-decoder pair corresponding to neural encoder 112/212 and neural decoder 114a/214a/114b, where the bottleneck values constitute the latent representation. An image x is first mapped to its latent space representation $y=\psi(x)$. After quantization, the resulting latents $\hat{y}$ are coded losslessly to a bit stream that can be decoded into the image $\hat{x}=\phi(\hat{y})$.

Data compression can be formally expressed as the minimization of both the expected length of the bitstream, as well as the expected distortion of the reconstructed image $\hat{x}$ compared to the original x, which leads to the optimization of the following rate-distortion trade-off:

$$L(\psi, \phi, p_{\hat{y}}) = \mathbb{E}_{x \sim p_x}[-\log_2 p_{\hat{y}}(\hat{y}) + \lambda d(x, \hat{x})] \quad \text{(Equation 1)}$$

Here, $-\log_2 p_{\hat{y}}(\hat{y})$ is the rate and $d(x, \hat{x})$ is the distortion measure, e.g. mean squared error. The rate corresponds to the length of compressed data bitstream 128/228 needed to encode the quantized representation $\hat{y}$, based on a learned entropy model $p_{\hat{y}}$ over the unknown distribution of natural compression input data $p_x$. The weight $\lambda$ steers the rate distortion trade-off, e.g. reducing $\lambda$ leads to a higher compression rate at the cost of a larger distortion of the reconstructed image.

Conventional approaches to improving compression results have attempted to optimize the neural network architecture to achieve more powerful encoder/decoder transformations by neural encoder 112/212 and neural decoder 114a/214a/114b. In existing approaches, Equation 1 is optimized over a corpus of potentially millions of compression input data in order to find optimal functions for encoding and decoding ($\psi$ and $\phi$), along with a suitable probability model $p_{\hat{y}}$ for the latent space utilized by neural encoder 112/212 and neural decoder 114a/214a/114b.

Although neural encoder 112/212 and neural decoder 114a/214a/114b have been trained over a large corpus of compression input data to find what should ideally be an optimal encoding function over the whole data set, according to the present inventive concepts the encoding can still be improved by adapting to each individual image. According to various implementations of the present concepts, this per-image adaptation is performed without changing neural encoder 112/212 and neural decoder 114a/214a/114b or the parameters of their latent space probability model, but by changing the latent values themselves when sending compression input data. As such, the novel and inventive approach disclosed in the present application is effectively working to solve an optimization problem when sending compression input data, for each image individually. For example, for the single image x, the present approach works to solve the following:

$$\frac{\operatorname{argmin}}{\hat{y}} - \log_2 p_{\hat{y}}(\hat{y}) + \lambda d(x, \hat{x}) \qquad \text{(Equation 2)}$$

The fact that the present data compression solution does not change the probability model utilized by neural encoder 112/212 and neural decoder 114a/214a/114b when performing content adaptive optimization is due to the assumption that neural decoder 114b and the probability model have been trained and deployed to compressed data receiver 126. Therefore, the present data compression solution seeks to find the best discrete latent representation for each image by varying only the latent values themselves.

There are several practical techniques for solving this problem, including both discrete and continuous optimization approaches. According to one exemplary implementation, the optimization problem described by Equation 2 is solved through an iterative procedure where gradient descent is applied on the latents according to:

$$y_{t+1} = y_t - \eta \nabla_y L(\psi, \phi, p_{\hat{y}}, x) \qquad \text{(Equation 3)}$$

Here, $L(\psi, \phi, p_{\hat{y}}, x)$ is the rate-distortion objective for a particular image x:

$$L(\psi, \phi, p_{\hat{y}}, x) = \log_2 p_{\hat{y}}(\hat{y}) + \lambda d(x, \hat{x}), \qquad \text{(Equation 4)}$$

and $\eta$ is the weighting applied to the gradient. This procedure requires a differentiable approximation of the quantization operation performed in the bottleneck and, in one implementation, additive uniform noise is used for this purpose. Adopting the notation $\mathcal{U}$ for an independent uniform noise of width 1, the density function $p_{\hat{y}}$ of the random variable $\hat{y} = y + \mathcal{U}(-\frac{1}{2}, \frac{1}{2})$ becomes a continuous differentiable relaxation of the probability mass function $p_{\hat{y}}$.

According to one implementation, a complete data compression pipeline is described by Algorithm 300, in FIG. 3. The lossless arithmetic encoding/decoding operations are represented by AE/AD. The step function on line 6 corresponds to updating the latent space representation according to the gradient step obtained from latent representation optimizer 240. In one implementation, for example, the latent space representation may be updated at a learning rate of 1 e$^{-3}$.

Referring now to FIGS. 1 and 2 in combination with FIG. 4, FIG. 4 shows flowchart 450 presenting an exemplary method for performing content adaptive optimization for neural data compression, according to one implementation. With respect to the method outlined in FIG. 4, it is noted that certain details and features have been left out of flowchart 450 in order not to obscure the discussion of the inventive features in the present application.

It is noted that neural encoder 112/212 and neural decoder 114a/214a/114b may be trained so as to be parameterized by an ANN, and neural decoder 114b and the probability model utilized by neural encoder 112/212 and neural decoder 114a/214a/114b may be deployed to compressed data receiver 126, prior to the start of the method outlined by flowchart 450.

Flowchart 450 begins with receiving series of compression input data 130/230 (action 451). As noted above, series of compression input data 130/230 may include compressible data in a variety of forms, including images, audio data, 2D motion fields, and color residuals, to name a few examples. In implementations in which the compression input data corresponds to images, for example series of compression input data 130/230 may correspond to a video stream, for example, where each of compression input data 130/230 is an individual frame of video. However, in other implementations, each of compression input data 130/230 may be an individual color value or data describing a 2D motion. Series of compression input data 130/230 may be received by neural encoder 112/212 of data compression software code 110/210, executed by hardware processor 104.

As noted above, in some implementations series of compression input data 130/230 may be received from data source 108 via communication network 120 and network communication links 122. However and as also noted above, in some implementations, data source 108 may be integrated with computing platform 102, or may be in direct communication with data processing system 100 as shown by dashed communication link 118. Thus, in some implementations, series of compression input data 130/230 may be received as transfer of data within data processing system 100.

Flowchart 450 continues with encoding first compression input data 232 of series of compression input data 130/230 to latent space representation 234 of first compression input data 232 (action 452). First compression input data 232 of series of compression input data 130/230 may be encoded to latent space representation 234 of first compression input data 232 by neural encoder 112/212 of data compression software code 110/210, executed by hardware processor 104. As discussed above, neural encoder 112/212 is parameterized during training using an ANN and is configured to encode first compression input data 232 to latent space representation 234 of first compression input data 232.

Flowchart 450 continues with decoding latent space representation 234 of first compression input data 232 to produce input space representation 236 of first compression input data 232 that corresponds to latent space representation 234 of first compression input data 232 (action 453). Latent space representation 234 of first compression input data 232 may be decoded to produce input space representation 236 of first compression input data 232 by neural decoder 114a/214a of data compression software code 110/210, executed by hardware processor 104. As discussed above, neural decoder 114a/214a, as well as neural decoder 114b deployed to compressed data receiver 126, are parameterized during training using an ANN and are configured to decode latent space representation 234 of first compression input data 232 to produce input space representation 236 of first compression input data 232.

Flowchart 450 continues with generating first compression input data refined latent values 238 for re-encoding first compression input data 232 based on a comparison of first compression input data 232 with input space representation 236 of first compression input data 232 (action 454). First compression input data refined latent values 238 may be generated by latent representation optimizer 240 of data compression software code 110/210, executed by hardware processor 104, in the manner described above. That is to say, first compression input data refined latent values 238 may be generated through comparison of first compression input data 232 with input space representation 236 of first compression input data 232 based on Equations 2, 3, and 4 above.

It is emphasized that first compression input data refined latent values 238 do not change any parameters of the latent space probability model of neural encoder 112/212, which is the same latent space probability model used by neural decoder 114a/214a/114b. Consequently, first compression input data refined latent values 238 do not change any parameters of latent space representation 234 of first compression input data 232, only the latent values applied to those parameters.

Flowchart 450 continues with, re-encoding first compression input data 232 using first compression input data refined latent values 238 to produce first compressed data $\hat{y}_1$ corresponding to first compression input data 232 (action 455). First compression input data 232 may be re-encoded to produce first compressed data $\hat{y}_1$ corresponding to first compression input data 232 by neural encoder 112/212 of data compression software code 110/210, executed by hardware processor 104.

Flowchart 450 can conclude with repeating actions 452, 452, 454, and 455 above on a per-image basis on second compression input data $x_2$ and each of subsequent compression input data $x_3, \ldots, x_n$ of series of compression input data 130/230 to produce compressed data compression input data $\hat{y}_2, \ldots, \hat{y}_n$ of compressed data bitstream 128/232 (action 456). Actions 452, 453, 454, and 455 may be repeated for each of compression input data $x_2, \ldots, x_n$ by data compression software code 110/210, executed by hardware processor 104, as described above.

For example, hardware processor 104 may execute data compression software code 110/210 to encode second compression input data $x_2$ to latent space representation $y_2$ of second compression input data $x_2$, decode latent space representation $y_2$ to produce input space representation $\hat{x}_2$ of second compression input data $x_2$ corresponding to latent space representation $y_2$, generate second compression input data refined latent values for re-encoding second compression input data $x_2$ based on a comparison of second compression input data $x_2$ with input space representation $\hat{x}_2$ of second compression input data $x_2$ and re-encode second compression input data $x_2$ using the second compression input data refined latent values to produce second compressed data $\hat{y}_2$ corresponding to second compression input data $x_2$, and so forth for compression input data $x_3, \ldots, x_n$.

It is noted that, although not included in flowchart 450, in some implementations, the present method can include transmitting compressed data bitstream 128/228 including first compressed data $\hat{y}_1$ to compressed data receiver 126 for decoding by neural decoder 114b and rendering by display 124. It is noted that display 124 may be implemented as a liquid crystal display (LCD), a light-emitting diode (LED) display, an organic light-emitting diode (OLED) display, or another suitable display screen that performs a physical transformation of signals to light. The transmitting of compressed data bitstream 128/228 to compressed data receiver 126 for decoding by neural decoder 114b and rendering by display 124 may be performed by data compression software code 110/210, executed by hardware processor 104 of computing platform 102.

Thus, the present application discloses a content adaptive optimization solution for neural data compression. The solution disclosed in the present application introduces an iterative procedure which adapts the latent representation encoded by a neural encoder to the specific content being compressed while advantageously keeping the parameters of the neural network and the predictive model fixed. The present solution delivers an overall increase in rate-distortion performance, independently of the specific architecture used to implement the neural network. Thus, the latent space adaptation techniques disclosed herein can be an effective strategy to make a given encoding process more powerful and content adaptive. This can be particularly advantageous in use cases such as content streaming, where the encoding complexity is not the limiting factor when compared to the transmission and decoding.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A data processing system comprising:
   a computing platform including a hardware processor and a system memory storing a data compression software code, a trained neural encoder and a trained neural decoder, wherein the trained neural encoder and the trained neural decoder each includes parameters of a latent space probability model determined during training using a neural network;
   the hardware processor configured to execute the data compression software code to:
   receive a plurality of compression input data;
   encode, using the trained neural encoder, a first compression input data of the plurality of compression input data to a latent space representation of the first compression input data;
   decode, using the trained neural decoder, the latent space representation of the first compression input data to produce an input space representation of the first compression input data corresponding to the latent space representation of the first compression input data;
   generate, using additive noise, first compression input data refined latent values based on a comparison of the first compression input data with the input space representation;
   re-encode, using the trained neural encoder, the first compression input data using the first compression input data refined latent values to produce a first compressed data corresponding to the first compression input data; and transmit the first compressed data to a remote trained neural decoder having the parameters of the latent space probability model;

wherein encoding, decoding and generating the first compression input data refined latent values do not change any of the parameters of the latent space probability model of each of the trained neural encoder and the trained neural decoder, thereby not requiring any change to any parameter of the latent space probability model of the remote trained neural decoder.

2. The data processing system of claim 1, wherein the first compression input data refined latent values do not change any parameters of the latent space representation of the first compression input data.

3. The data processing system of claim 1, wherein the hardware processor is further configured to execute the data compression software code to:

encode, using the trained neural encoder, a second compression input data of the plurality of compression input data to a latent space representation of the second compression input data;

decode, using the trained neural decoder, the latent space representation of the second compression input data to produce an input space representation of the second compression input data corresponding to the latent space representation of the second compression input data;

generate second compression input data refined latent values based on a comparison of the second compression input data with the input space representation of the second compression input data; and re-encode, using the trained neural encoder, the second compression input data using the second compression input data refined latent values to produce a second compressed data corresponding to the second compression input data.

4. The data processing system of claim 1, wherein the plurality of compression input data comprise a plurality of images.

5. The data processing system of claim 1, wherein the plurality of compression input data comprise a video stream.

6. The data processing system of claim 1, wherein the plurality of compression input data comprise one of a plurality of two-dimensional (2D) motion data or a plurality of color values.

7. A method for use by a data processing system including a computing platform having a hardware processor and a system memory storing a data compression software code, a trained neural encoder and a trained neural decoder, the trained neural encoder and the trained neural decoder each including parameters of a latent space probability model determined during training using a neural network, the method comprising:

receiving, by the data compression software code executed by the hardware processor, a plurality of compression input data;

encoding, using the trained neural encoder by the data compression software code executed by the hardware processor, a first compression input data of the plurality of compression input data to a latent space representation of the first compression input data;

decoding, using the trained neural decoder by the data compression software code executed by the hardware processor, the latent space representation of the first compression input data to produce an input space representation of the first compression input data corresponding to the latent space representation of the first compression input data;

generating, by the data compression software code executed by the hardware processor and using additive noise, first compression input data refined latent values, based on a comparison of the first compression input data with the input space representation;

re-encoding, using the trained neural encoder by the data compression software code executed by the hardware processor, the first compression input data using the first compression input data refined latent values to produce a first compressed data corresponding to the first compression input data;

transmitting the first compressed data to a remote trained neural decoder having the parameters of the latent space probability model;

wherein encoding, decoding and generating the first compression input data refined latent values do not change any of the parameters of the latent space probability model of each of the trained neural encoder and the trained neural decoder, thereby not requiring any change to any parameter of the latent space probability model of the remote trained neural decoder.

8. The method of claim 7, wherein the first compression input data refined latent values do not change any parameters of the latent space representation of the first compression input data.

9. The method of claim 7, further comprising:

encoding, using the trained neural encoder by the data compression software code executed by the hardware processor, a second compression input data of the plurality of compression input data to a latent space representation of the second compression input data;

decoding, using the trained neural decoder by the data compression software code executed by the hardware processor, the latent space representation of the second compression input data to produce an input space representation of the second compression input data corresponding to the latent space representation of the second compression input data;

generating, by the data compression software code executed by the hardware processor, second compression input data refined latent values based on a comparison of the second compression input data with the input space representation of the second compression input data; and re-encoding, using the trained neural encoder by the data compression software code executed by the hardware processor, the second compression input data using the second compression input data refined latent values to produce a second compressed data corresponding to the second compression input data.

10. The method of claim 7, wherein the plurality of compression input data comprise a plurality of images.

11. The method of claim 7, wherein the plurality of compression input data comprise a video stream.

12. The method of claim 7, wherein the plurality of compression input data comprise one of a plurality of two-dimensional (2D) motion data or a plurality of color values.

13. A data processing system comprising:

a computing platform including a hardware processor and a system memory storing a data compression software code, a trained neural encoder and a trained neural decoder, wherein the trained neural encoder and the trained neural decoder each includes parameters of a latent space probability model determined during training using a neural network;

the hardware processor configured to execute the data compression software code to:

receive a plurality of compression input data;

encode, using the trained neural encoder, a first compression input data of the plurality of compression input data to a latent space representation of the first compression input data;

decode, using the trained neural decoder, the latent space representation of the first compression input data to produce an input space representation of the first compression input data corresponding to the latent space representation of the first compression input data;

generate, using additive noise, first compression input data refined latent values based on a comparison of the first compression input data with the input space representation; and re-encode, using the trained neural encoder, the first compression input data using the first compression input data refined latent values to produce a first compressed data corresponding to the first compression input data;

wherein encoding, decoding and generating the first compression input data refined latent values do not change any of the parameters of the latent space probability model of each of the trained neural encoder and the trained neural decoder.

14. The data processing system of claim 13, wherein the first compression input data refined latent values do not change any parameters of the latent space representation of the first compression input data.

15. The data processing system of claim 13, wherein the hardware processor is further configured to execute the data compression software code to:

encode, using the trained neural encoder, a second compression input data of the plurality of compression input data to a latent space representation of the second compression input data;

decode, using the trained neural decoder, the latent space representation of the second compression input data to produce an input space representation of the second compression input data corresponding to the latent space representation of the second compression input data;

generate second compression input data refined latent values based on a comparison of the second compression input data with the input space representation of the second compression input data; and re-encode, using the trained neural encoder, the second compression input data using the second compression input data refined latent values to produce a second compressed data corresponding to the second compression input data.

16. The data processing system of claim 13, wherein the plurality of compression input data comprise a plurality of images.

17. The data processing system of claim 13, wherein the plurality of compression input data comprise a video stream.

18. The data processing system of claim 13, wherein the plurality of compression input data comprise one of a plurality of two-dimensional (2D) motion data or a plurality of color values.

19. The data processing system of claim 1, wherein the additive noise is a uniform additive noise.

20. The method of claim 7, wherein the additive noise is a uniform additive noise.

* * * * *